US011492112B2

(12) United States Patent
Ni

(10) Patent No.: US 11,492,112 B2
(45) Date of Patent: Nov. 8, 2022

(54) UNMANNED AERIAL VEHICLE

(71) Applicant: AUTEL ROBOTICS CO., LTD., Guangdong (CN)

(72) Inventor: Feng Ni, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 359 days.

(21) Appl. No.: 16/747,180

(22) Filed: Jan. 20, 2020

(65) Prior Publication Data
US 2020/0148353 A1 May 14, 2020

Related U.S. Application Data

(63) Continuation of application No. PCT/CN2018/083758, filed on Apr. 19, 2018.

(30) Foreign Application Priority Data

Jul. 21, 2017 (CN) .......................... 201710601093.7

(51) Int. Cl.
B64C 1/30 (2006.01)
B64C 39/02 (2006.01)
B64C 3/56 (2006.01)
B64C 27/08 (2006.01)
B64C 27/37 (2006.01)

(52) U.S. Cl.
CPC .............. B64C 39/024 (2013.01); B64C 1/30 (2013.01); B64C 3/56 (2013.01); B64C 27/08 (2013.01); B64C 27/37 (2013.01); B64C 2201/024 (2013.01); B64C 2201/108 (2013.01)

(58) Field of Classification Search
CPC .................................. B64C 1/30; B64C 1/063
See application file for complete search history.

(56) References Cited

U.S. PATENT DOCUMENTS

2008/0201901 A1* 8/2008 Cescon ................. G02C 5/2263
16/228
2017/0043870 A1* 2/2017 Wu .......................... B64C 27/12
2018/0327092 A1* 11/2018 Deng ........................ B64C 1/30

FOREIGN PATENT DOCUMENTS

| CN | 102556336 A | 7/2012 |
| CN | 105000163 A | 10/2015 |
| CN | 105314088 A | 2/2016 |
| WO | 2014097292 A1 | 6/2014 |

OTHER PUBLICATIONS

International Search Report dated Jul. 26, 2018; PCT/CN2018/083758.

* cited by examiner

Primary Examiner — Timothy D Collins
Assistant Examiner — Terri L Filosi

(57) ABSTRACT

The present invention relates to the field of air vehicle technologies and provides an unmanned aerial vehicle (UAV), including a vehicle body and arms connected to the vehicle body. The arm is hinged to the vehicle body by using a spherical hinge portion and may be folded or unfolded relative to the vehicle body. Through the forgoing manner, the arm is connected to the vehicle body of the UAV by using the spherical hinge. The arm can be folded and unfolded smoothly without interference, which conforms to known operation habits of users, so that after the entire UAV is folded, the structure becomes more compact and easier to carry. In addition, it can be effectively avoided that the UAV is damaged due to impact in the carrying process.

7 Claims, 3 Drawing Sheets

UNMANNED AERIAL VEHICLE

This application is a continuation application of International Application No. PCT/CN2018/083758, filed on Apr. 19, 2018, which claims priority of Chinese Patent Application No. 201710601093.7, filed on Jul. 21, 2017, which is incorporated herein by reference in its entirety.

BACKGROUND

Technical Field

The present invention relates to the field of air vehicle technologies, and in particular, to an unmanned aerial vehicle.

Related Art

An unmanned aerial vehicle (UAV) is a type of new concept equipment in rapid development, and has advantages of high flexibility, quick response, pilotless driving and low operation requirements. The UAV can implement functions of real-time image and video transmission and high-risk area detection by carrying a plurality of types of sensors or camera devices, and is a powerful supplement of satellite remote sensing and conventional aerial remote sensing. Currently, the application range of the UAV has been expanded to three fields: military, scientific research and civil use, and in particular, to fields such as power communication, meteorology, agriculture, ocean, exploration, photography, disaster prevention and reduction, crop yield estimation, drug enforcement and smuggling suppression, border patrol, and public security and anti-terrorist.

Currently, a rotor UAV is generally not easy to carry. Although some UAVs can be simply folded, the folding structure is still not compact enough. Many UAVs are folded simply by only bending rotor arms, and the size of the UAV is not comprehensively reduced in a dimension of length, width or height.

SUMMARY

To resolve the foregoing technical problem, embodiments of the present invention provide a foldable unmanned aerial vehicle (UAV) with a compact structure.

To resolve the foregoing technical problem, the embodiments of the present invention provide the following technical solutions:

A UAV is provided, including a vehicle body and arms connected to the vehicle body, where the arm is hinged to the vehicle body by using a spherical hinge portion and is folded or unfolded relative to the vehicle body.

In an embodiment of the present invention, the spherical hinge portion includes a spherical hinge housing disposed on the vehicle body and a spherical hinge that is accommodated in the spherical hinge housing and that is connected to the arm.

In an embodiment of the present invention, the spherical hinge portion includes a spherical hinge housing disposed on the arm and a spherical hinge that is accommodated in the spherical hinge housing and that is connected to the vehicle body.

In an embodiment of the present invention, the UAV further includes a limiting structure configured to prevent the arm from rotating relative to the vehicle body when the arm is in a folded or unfolded state, the limiting structure including a first clamping portion disposed on the spherical hinge housing and a second clamping portion that is disposed on the arm and that is clamped to the first clamping portion.

In an embodiment of the present invention, the spherical hinge housing is further provided with an open slot in a folding or unfolding direction of the arm, the first clamping portion is clamping slots that are disposed on the spherical hinge housing and that are respectively located on both sides of the open slot and the second clamping portion is a clamping block disposed on the arm.

In an embodiment of the present invention, the spherical hinge housing is further provided with an open slot in a folding or unfolding direction of the arm, the first clamping portion is clamping blocks that are disposed on the spherical hinge housing and that are respectively located on both sides of the open slot and the second clamping portion is a clamping slot disposed on the arm.

In an embodiment of the present invention, the spherical hinge housing includes a first portion, a second portion and an accommodating space that is surrounded by the first portion and the second portion and that is used for accommodating the spherical hinge; and the first portion has a first side edge, the second portion has a second side edge disposed at an interval relative to the first side edge and the open slot is formed by a gap between the first side edge and the second side edge.

In an embodiment of the present invention, the first side edge and/or the second side edge are/is further provided with an arc-shaped side edge used for avoiding the second clamping portion.

In an embodiment of the present invention, the spherical hinge housing is hemispheric.

Compared with the prior art, the arm in the embodiments of the present invention is connected to the vehicle body of the UAV by using the spherical hinge portion. The arm can be folded and unfolded smoothly without hault, which conforms to known operation habits of users, so that after the entire UAV is folded, the structure becomes more compact and easier to carry. In addition, it can be effectively avoided that the UAV is damaged due to collision in the carrying process.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of the present invention, the present invention is described in further detail below with reference to the accompanying drawings and specific embodiments. It should be noted that when an element is described as being "fixed" to another element, the element may be directly on the another element, or one or more intermediate elements may exist therebetween. When an element is described as being "connected" to another element, the element may be directly connected to the another element, or one or more intermediate elements may exist therebetween. A direction or location relationship indicated by the term "up", "down", "inside", "outside", "bottom", or the like used in the specification is a direction or location relationship shown based on the accompanying drawings, and is only for ease of describing the present invention and simplifying the description, but is not intended to indicate or imply that a mentioned device or element needs to have a particular direction or is constructed and operated in a particular direction. Therefore, the direction or location relationship cannot be understood as a limitation to the present invention. In addition, the terms such as "first", "second" and "third" are used only for the purpose of description, and should not be understood as indicating or implying the relative importance.

Unless otherwise defined, meanings of all technical and scientific terms used in this specification are the same as meanings usually understood by persons skilled in the technical field to which the present invention belongs. In this specification, terms used in the specification of the present invention are merely intended to describe objectives of the specific embodiments, but are not intended to limit the present invention. A term "and/or" used in this specification includes any or all combinations of one or more related listed items.

In addition, the technical features provided in the different embodiments of the present invention described below may be combined with each other if no conflict occurs.

Figure 1:
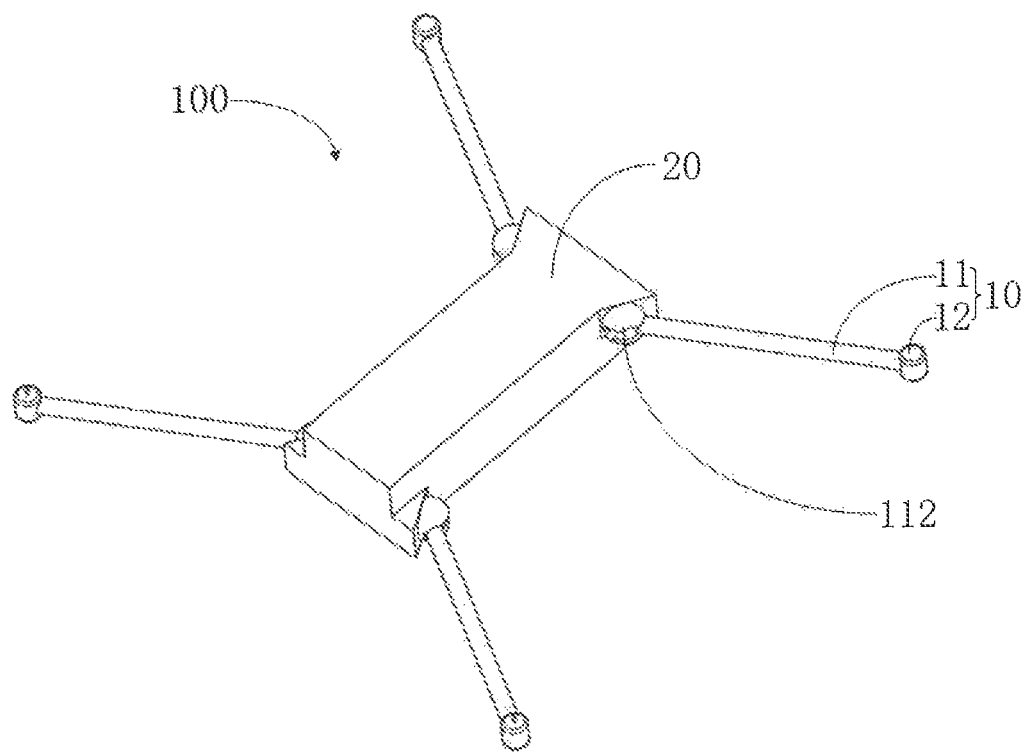
FIG. 1 is a three-dimensional structural diagram of an embodiment of an unmanned aerial vehicle (UAV) according to the present invention, where arms of the UAV are in an unfolding state.
Figure 2:
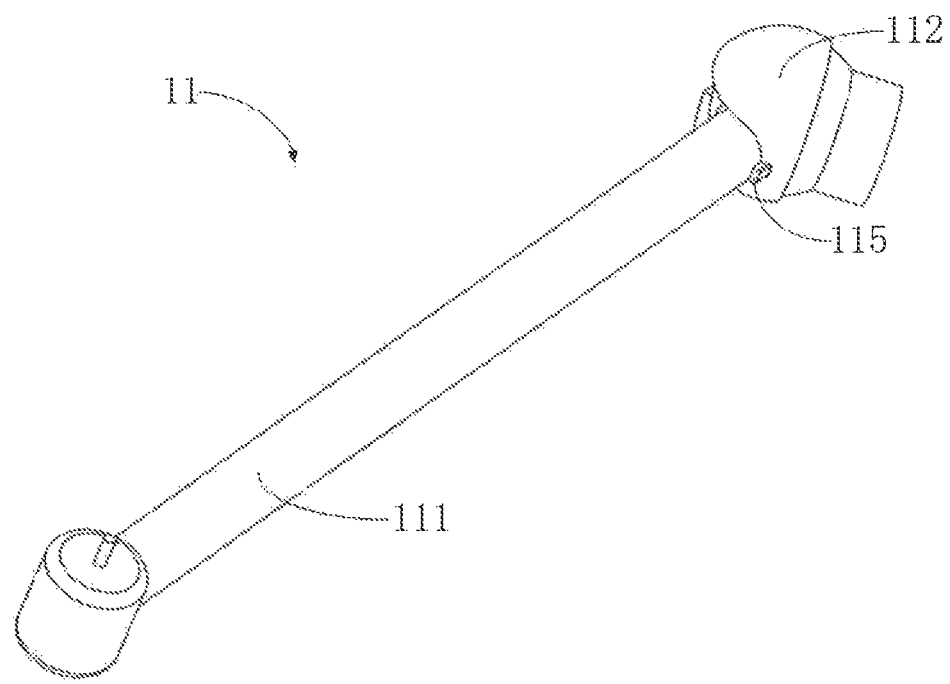
FIG. 2 is an assembly diagram of an arm and a spherical hinge portion of the UAV shown in FIG. 1.

Referring to FIG. 1 to FIG. 2 together, the embodiments of the present invention provide an unmanned aerial vehicle (UAV) 100, including a power component 10 and a vehicle body 20. The power component 10 is mounted on the vehicle body 20 and is configured to supply power to the UAV 100 and drive the UAV 100 to fly. The power component 10 may be further applied to flying toys and the like.

The vehicle body 20 includes a control circuit component including electronic components such as an MCU. The control circuit component includes a plurality of control modules, for example, a flight control module configured to control a flight attitude of the UAV, a Beidou module or a GPS module configured to navigate the UAV and a data processing module configured to process environmental information obtained by related airborne equipment.

As shown in FIG. 2, the power component 10 in the embodiments of the present invention is hinged to the vehicle body 20 by using a spherical hinge portion 112 and may be folded or unfolded relative to the vehicle body 20. The power component 10 includes arms 11, a driving device 12 disposed at one side of the arm 11 and a propeller (not shown in the figure) mounted on the driving device 12.

Figure 3:
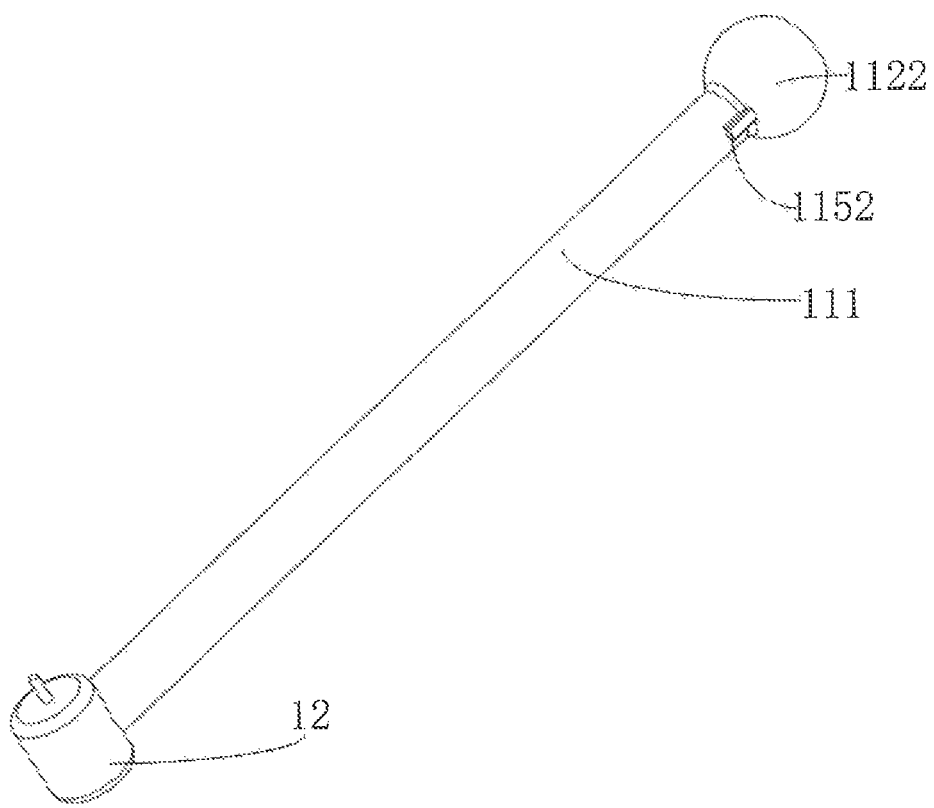
FIG. 3 is a three-dimensional structural diagram of an arm of the UAV shown in FIG. 1.
Figure 4:
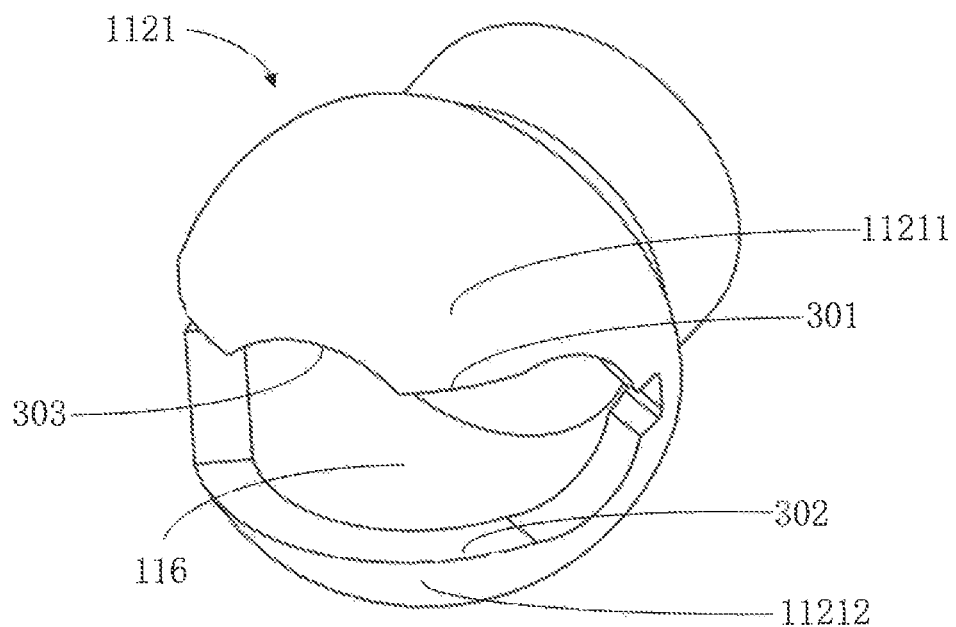
FIG. 4 is a three-dimensional structural diagram of a spherical hinge housing of the UAV shown in FIG. 1.

As shown in FIG. 3 and FIG. 4, the spherical hinge portion 112 includes a spherical hinge housing 1121 disposed on the vehicle body 20 and a spherical hinge 1122 that is accommodated in the spherical hinge housing 1121 and that is connected to a tail end of the arm 11. In another possible embodiment, the spherical hinge housing of the spherical hinge portion may alternatively be disposed on the arm, so that the spherical hinge is disposed on the vehicle body. The spherical hinge housing 1121 may alternatively be integrally formed with the vehicle body 20.

Figure 5:
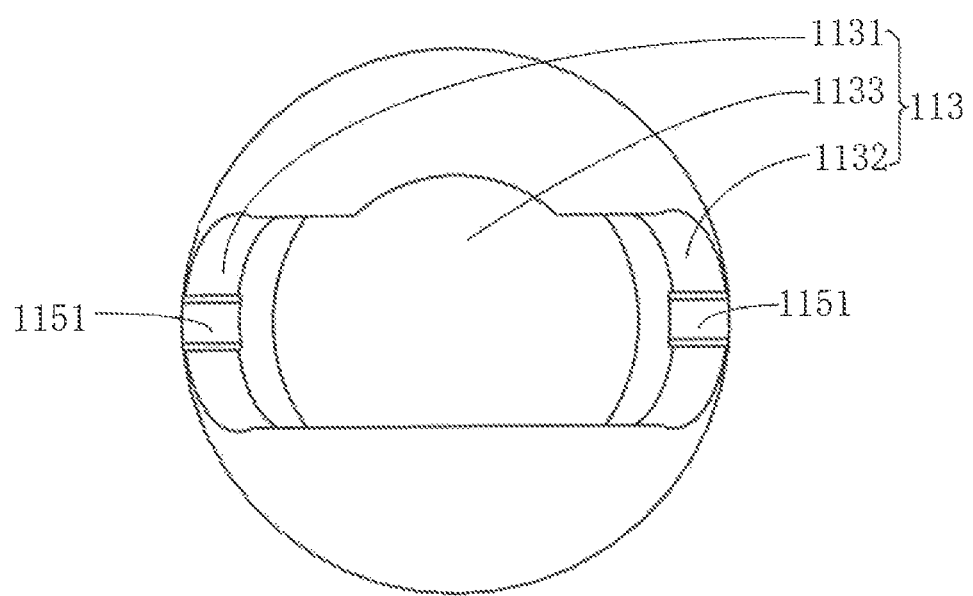
FIG. 5 is a front view of the spherical hinge housing shown in FIG. 4.

As shown in FIG. 4 and FIG. 5, in an embodiment of the present invention, the spherical hinge housing 1121 includes a first portion 11211, a second portion 11212 and an accommodating space 116 that is surrounded by the first portion 11211 and the second portion 11212 and that is used for accommodating the spherical hinge 1122. The first portion 11211 has a first side edge 301, the second portion 11212 has a second side edge 302 disposed at an interval relative to the first side edge 301 and an open slot 113 is formed by a gap between the first side edge 301 and the second side edge 302. The arm 11 may slide along the open slot 113 to be folded or unfolded relative to the vehicle body 20.

In an embodiment of the present invention, the spherical hinge housing 1121 is hemispheric. In another possible embodiment, the spherical hinge housing 1121 may alternatively be another shape.

In an embodiment of the present invention, the UAV 100 may further include a limiting structure 115 (as shown in FIG. 2). The limiting structure 115 is configured to prevent the arm 11 from rotating relative to the vehicle body 20 when the arm 11 is in a folded or unfolded state.

In an embodiment of the present invention, the limiting structure 115 may further include a first clamping portion disposed on the spherical hinge housing 1121 and a second clamping portion that is disposed on an arm body 111 and that is clamped to the first clamping portion. In an embodiment of the present invention, the first clamping portion is clamping slots 1151 that are disposed on the spherical hinge housing 1121 and that are respectively located on both sides of the open slot 113 and the second clamping portion is a clamping block 1152 that is disposed on the arm body 111 and that is clamped to the clamping slot 1151. In another possible embodiment, the first clamping portion may alternatively be a clamping block disposed on the spherical hinge housing and the second clamping portion is correspondingly a clamping slot that is disposed on the arm body and that is clamped to the clamping block.

When the arm 11 slides to two sides in the open slot 113, that is, in a folded or unfolded state, the arm 11 is located in a manner in which the clamping block 1152 on the arm 11 is clamped to the clamping slot 1151 on the spherical hinge housing 1121, to prevent the arm 11 from unnecessarily rotating relative to the arm 20.

In an embodiment of the present invention, to avoid the clamping block 1152 on the arm 11 during rotating of the arm 11, the first side edge 301 of the first portion 11211 of the spherical hinge housing 1121 is provided with an arc-shaped side edge 303. As shown in FIG. 5, in the process that the clamping block 1152 is separated from the clamping slot 1151 located at the left side of the figure and is unfolded to right, the arm 11 needs to be rotated, so that the clamping block 1152 faces the clamping slot 1151 located at the right side of the figure. Therefore, to enable the arm 11 to smoothly rotate, the arc-shaped side edge 303 bent in the direction away from the open slot 113 is arranged on the first side edge 301. It should be understood that, alternatively, the arm 11 may be provided with two clamping blocks or the open slot may be expanded, and the arc-shaped side edge 303 may be omitted.

In some other possible embodiments, an arc-shaped side edge used for avoiding the clamping block may alternatively be provided on the second side edge 302. Alternatively, the first side edge 301 and the second side edge 302 are both provided with an arc-shaped side edge used for avoiding the clamping block.

As shown in FIG. 5, in an embodiment of the present invention, the open slot 113 includes a first circular opening 1131, a second circular opening 1132 and a third circular opening 1133. The third circular opening 1133 is located between the first circular opening 1131 and the second circular opening 1132, and the third circular opening 1133 is in communication with the first circular opening 1131 and the second circular opening 1132.

A cross-sectional shape of the arm body 111 is circular. The arm body 111 may slide in an opening of the open slot 113 and may be stuck by any of the first circular opening 1131 and the second circular opening 1132. When the arm body 111 is stuck in the first circular opening 1131, the clamping block 1152 is embedded in the clamping slot 1151 and is stuck by the clamping slot 1151. The arm body 111 is stuck in the first circular opening 1131, to prevent the arm body 111 from sliding in the open slot 113. When the arm body 111 is stuck by the second circular opening 1132, the clamping block 1152 is embedded in the other clamping slot 1151 and is stuck by the other clamping slot 1151. The arm body 111 is stuck in the second circular opening 1132, to prevent the arm body 111 from sliding.

A size of the first circular opening 1132 is equal to a size of the second circular opening 1133, and a diameter of the third circular opening 1133 is greater than a diameter of the first circular opening 1131. During folding or unfolding, the arm body 111 first slides from the first circular opening 1131 to the third circular opening 1133, and rotates by 180 degrees in the third circular opening 1133. A diameter of the arm body 111 is equal to the diameter of the first circular opening 1131 and the second circular opening 1132. Therefore, due to the clamping block 1152, the arm body 111 cannot rotate in the first circular opening 1131 or the second circular opening 1132. The arm body 111 after rotation may successfully enter the second circular opening 1132 and the clamping block 1152 is embedded in the other clamping slot 1151.

It may be understood that, in some other embodiments, the first clamping portion is clamping blocks that are disposed on the spherical hinge housing and that are respectively located on both sides of the open slot and the second clamping portion is a clamping slot. There are two clamping blocks 1152 in total, which are both disposed on opposite sides of one end of the arm body 111. A connecting line of the two clamping blocks 1152 is perpendicularly intersects an axis of the arm body 111. The two clamping blocks 1152 are respectively disposed at locations of the two clamping slots 1151 in the embodiment shown in FIG. 5. The arm body 111 is provided with the two clamping slots 1151. That is, the clamping slot 1151 is disposed at the location of the clamping block 1152 in the embodiment shown in FIG. 3.

During a flight, the arm 11 is in an unfolded state. When the arm body 111 is stuck in the first circular opening 1131, the clamping block 1152 is embedded in the clamping slot 1151 shown on the left side of FIG. 5 and is stuck by the clamping slot 1151. The arm 11 is fully fixed. The driving device 12 disposed at the other end of the arm 11 provides power for the UAV 100, to drive the UAV 100 to fly.

After the flight ends, the arm body 111 first slides to the third circular opening 1133, so that the clamping block 1152 on the arm body 111 is separated from the clamping slot 1151 shown on the left side of FIG. 5 and rotates by 180 degrees in the third circular opening 1133, so that the clamping block 1152 faces the clamping slot 1151 shown on the right side of FIG. 5. Then, the arm body 111 slides from the third circular opening 1133 to the second circular opening 1132, so that the arm body 111 is stuck in the second circular opening 1132, and the clamping block 1152 is embedded in the clamping slot 1151 shown on the right side of FIG. 5 and is stuck by the other clamping slot 1151. In this case, the arm 11 is folded. Next, the propeller is folded (if possible), so that the power component 10 tightly clings to two opposite sides of the vehicle body 20.

Based on the foregoing structure design, compared with the existing manner of folding arms of the UAV, the arm 11 in the embodiments of the present invention are hinged to the vehicle body 20 of the UAV 100 by using the spherical hinge portion 112. The arm can be folded and unfolded smoothly without interference, which conforms to known operation habits of users, so that the structure becomes more compact and easier to carry. In addition, it can be effectively avoided that the UAV is damaged due to impact in the carrying process.

Finally, it should be noted that the foregoing embodiments are merely intended for describing the technical solutions of the present invention other than limiting the present invention. Under the idea of the present invention, technical features in the foregoing embodiments or different embodiments may be combined, steps may be implemented in any sequence and many changes such as the foregoing different aspects of the present invention may exist, which are not provided in detail for brevity. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An unmanned aerial vehicle (UAV), comprising a vehicle body and arms connected to the vehicle body, wherein the arms are hinged to the vehicle body by using a spherical hinge portion and is folded or unfolded relative to the vehicle body;

wherein the spherical hinge portion comprises a spherical hinge housing disposed on the vehicle body and a spherical hinge that is accommodated in the spherical hinge housing and that is connected to the arms;

wherein the spherical hinge housing is further provided with an open slot in a folding or unfolding direction of the arms, the open slot includes a first circular opening, a second circular opening and a third circular opening, the third circular opening is located between the first circular opening and the second circular opening, and the third circular opening is in communication with the first circular opening and the second circular opening.

2. The UAV according to claim 1, wherein the UAV further comprises a limiting structure configured to prevent the arms from rotating relative to the vehicle body when the arms are in a folded or unfolded state, the limiting structure comprising a first clamping portion disposed on the spherical hinge housing and a second clamping portion that is disposed on the arms and that is clamped to the first clamping portion.

3. The UAV according to claim 1, wherein a first clamping portion is clamping slots that are disposed on the spherical hinge housing and that are respectively located on both sides of the open slot and a second clamping portion is a clamping block disposed on the arms.

4. The UAV according to claim 3, wherein
the spherical hinge housing comprises a first portion, a second portion and an accommodating space that is surrounded by the first portion and the second portion and that is used for accommodating the spherical hinge; and the first portion has a first side edge, the second portion has a second side edge disposed at an interval relative to the first side edge and the open slot is formed by a gap between the first side edge and the second side edge.

5. The UAV according to claim 4, wherein the first side edge and/or the second side edge are/is further provided with an arc-shaped side edge used for avoiding the second clamping portion.

6. The UAV according to claim 1, wherein the spherical hinge housing is further provided with an open slot in a folding or unfolding direction of the arms, a first clamping portion is clamping blocks that are disposed on the spherical hinge housing and that are respectively located on both sides of the open slot and a second clamping portion is a clamping slot disposed on the arms.

7. The UAV according to claim 1, wherein the spherical hinge housing is hemispheric.

* * * * *